United States Patent Office 2,817,652
Patented Dec. 24, 1957

2,817,652

ESTERIFIED ETHERIFIED N-ALKYLGLUCAMINES

Fred E. Boettner, Philadelphia, Pa., assignor to Rohm & Haas Company, Philadelphia, Pa., a corporation of Delaware No Drawing. Application August 19, 1954
Serial No. 451,048

26 Claims. (Cl. 260—97)

This invention relates to products formed by etherifying N-alkylglucamines with ethylene oxide and then esterifying the resulting compounds with certain acids which will be defined hereinafter. It also relates to a method for the preparation of these compounds.

The products of the present invention may be represented by the formula

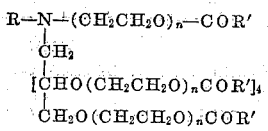

in which R is any alkyl group of one to four carbon atoms, R' is a hydrocarbon group of seven to seventeen carbon atoms, and $n$ is in integer from four to thirteen.

The present products are prepared by reacting an N-alkylglucamine with the desired number of ethylene oxide units and then reacting the resulting compound with a carboxylic acid. A unit or two of propylene oxide may be substituted for a similar amount of ethylene oxide without substantially altering the identifying characteristics of the product. Proplyene oxide and ethylene oxide are equivalent to this extent.

The N-alkylglucamine reactants are well-known compounds and include N-methylglucamine, N-ethylglucamine, N-propylglucamine, N-isopropylglucamine, N-butylglucamine, N-isobutylglucamine, N-sec-butylglucamine, and N-tert-butylglucamine.

The carboxylic acids employed in this invention are monocarboxylic acids containing from eight to eighteen carbon atoms. The R' constituent of these acids preferably represents an aliphatic group of seven to seventeen carbon atoms, including both saturated and unsaturated members. Although aromatic groups may be employed as an R' constituent, the aliphatic groups are preferred. Actually, the individual identity of the R' group is not especially critical. It may be any hydrocarbon group of sufficient size to impart the desired hydrophobic character to the compounds of this invention. The desired hydrocarbon groups should have seven to seventeen carbon atoms. As suitable acid reactants, there may be employed caprylic, pelargonic, capric, undecanoic, lauric, myristic, palmitic, margaric, stearic, undecylenic, oleic, linoleic, linolenic, butylbenzoic, naphthenic, octylhexahydrobenzoic, and the like. There may also be used, in place of individual acids, mixtures of acids, such as occur in natural fats and oils, as in coconut oil, animal fat, palm oil, castor oil, linseed oil, and such, and tall oil acids. The R' group should be of sufficient size to supply the hydrophobic balance required for the ethylene oxide units in the final product. Therefore, R' should contain from seven to seventeen carbon atoms, as previously defined.

The number of ethylene oxide or ethoxy units employed may be varied, as desired, within the range of four to thirteen for each of the six reactive hydrogens of the N-alkylglucamine used. This means that when four ethoxy units are reacted at each of the six places of reactivity, the total number of ethoxy units in the compound is twenty-four. Similarly, when thirteen ethoxy units are reacted at each of the six points of reactivity, the total number of ethoxy units in the compound is seventy-eight. Therefore, the total range of ethoxy units in the subject compounds is from twenty-four to seventy-eight. If desired, a unit or two of propylene oxide may be substituted for a similar amount of ethylene oxide without materially changing the character of the product. The presence of twenty-four ethoxy units gives the product a hydrophilic trait sufficient to assure water-solubility. The presence of additional ethoxy units tends to increase the solubility of the present compounds which is especially desirable as R' approaches the upper limit of seventeen carbon atoms.

In the reaction between ethylene oxide and the N-alkylglucamines, there is sometimes obtained a mixture of compounds having different numbers of ethoxy units. Furthermore, it may well be that the ethoxy units do not always add on in equal numbers at each of the six of the reactive hydrogen positions. Neither of the two conditions just described is a deterrent to the present reaction since satisfactory and useful products are formed from the mixture of compounds in the same way as the individual compounds. The reaction between the N-alkylglucamines and ethylene oxide is preferably conducted in the presence of small amounts of an alkaline catalyst such as the alkali metal hydroxides, like those of sodium, potassium, and the like, although in some cases no catalyst is required. While the reaction may be carried on at lower temperatures and at atmospheric pressure in the presence of solvents, it is preferred to conduct it at temperatures above 100° C. under pressures greater than atmospheric with or without solvents. The reaction is conducted until the desired theoretical amount of ethylene oxide has been taken up by the reaction mixture. This serves as an indication of the amount of ethylene oxide that has reacted.

The compounds formed from ethylene oxide and the N-alkylglucamines are reacted with suitable acids, previously defined, in the presence of an esterification catalyst to form the products of this invention. Suitable esterification catalysts include p-toluenesulfonic acid, sulfuric acid, benzenesulfonic acid, alkanesulfonic acids, sulfonated cation-exchange resins in their hydrogen form, among others. The esterification reaction is preferably conducted in the presence of a volatile, inert, organic solvent, such as benzene, toluene, xylene, and the like.

The esterification reaction may be carried out preferably between about 50° C. and the reflux temperature of the reaction, but it is preferable to employ the reflux temperature in order to accelerate the rate of reaction and to maximize yields. It is desirable, in order to have an indication of reaction progress and ultimate completion, to remove the water liberated during the esterification. This water by-product may then be collected and measured. The reaction is continued until the theoretical amount of water has been liberated. At the conclusion of the reaction, a small amount of alkali is introduced to neutralize the catalyst.

The product is obtained by filtering the reaction mixture after the neutralization step and then evaporating the filtrate to dryness.

The products of this invention are surface-active and are useful as detergents showing good detergency and practically no foam in the normal washing concentrations. These products are also useful as emulsifiers and as depressants of the surface tension of water.

The present products are prepared according to the following illustrative examples in which parts by weight are used throughout.

Example 1

Into a reaction vessel, there were charged 78.2 parts of N-methylglucamine and 0.2 part of powdered 85% potassium hydroxide. The vessel was sealed and then flushed with nitrogen. The absolute pressure of the system was increased to 8 to 10 inches of mercury. The temperature of the system was gradually increased until the reaction mixture became molten, which occurred at about 120° C. Ethylene oxide was slowly introduced while the temperature of the reaction mixture was maintained in the range of 120° to 160° C. During the ethylene oxide addition, the absolute pressure was adjusted to and maintained at 10 to 15 inches of mercury. The addition of ethylene oxide was continued until the theoretical amount was added for a compound in which $n$, in the formula set forth previously, equals eight. The reaction mixture was cooled, removed from the reaction vessel and diluted with isopropanol. The solution formed by the isopropanol addition was neutralized with aqueous 50% sulfuric acid and then stripped under reduced pressure and then filtered. The filtrate was a dark brown oil which represented the addition compound of N-methylglucamine and a total number of forty-eight ethylene oxide units. This addition compound, in the amount of 117.25 parts, was placed in a reaction vessel along with 88.8 parts of tall oil, 100 parts of toluene, and 10 parts of p-toluenesulfonic acid. This mixture was heated to 126° to 130° C., which is the reflux temperature, and maintained at that level for fifteen and a half hours at the end of which time the theoretical amount of water liberated from the esterification had been separated from the reaction mixture. The mixture was cooled and the catalyst neutralized by the addition of aqueous 20% sodium hydroxide. The mixture was then filtered and the filtrate was evaporated to dryness. The product was identified as the tall oil ester of the addition compound of N-methylglucamine and forty-eight units of ethylene oxide.

Similarly, there was prepared the linoleic ester of the addition compound of N-methylglucamine and sixty units of ethylene oxide.

Example 2

There were introduced into a reaction vessel 90 parts of N-methylglucamine and 0.25 part of sodium hydroxide. The vessel was sealed and flushed with nitrogen. The pressure of the system was adjusted at 9 to 10 inches of mercury. The temperature was raised to 118 to 123° C. in which range the reaction mixture became molten. Ethylene oxide was slowly introduced until the theoretical amount was added for a compound in which $n$, in the formula previously given, equals four. During the ethylene oxide addition the temperature of the system was held between 123° and 160° C. and the pressure was maintained at 10 to 15 inches of mercury. At the end of the ethylene oxide addition, the reaction mixture was cooled and removed from the reaction vessel. Isopropanol was added to the reaction mixture and the resulting solution was neutralized with aqueous 50% sulfuric acid. The solution was stripped under reduced pressure and then filtered. The filtrate was an oil which represented the addition compound of N-methylglucamine and a total of twenty-four ethylene oxide units. This compound, in the amount of 125.1 parts, was placed in a reaction vessel and reacted with 86.4 parts of caprylic acid in the presence of 12 parts of p-toluenesulfonic acid and 150 parts of toluene. The reaction was carried out at the reflux temperature of the reaction mixture. At the end of the twelve hours, the theoretical amount of water liberated from the esterification had been separated. The mixture was cooled and aqueous 20% sodium hydroxide added to neutralize the catalyst. The mixture was filtered and the filtrate was concentrated at reduced pressures. The product was identified as the caprylic ester of the addition compound of N-methylglucamine and twenty-four units of ethylene oxide.

In a like manner, there was prepared the undecylenic ester of the addition compound of N-propylglucamine and twenty-four units of ethylene oxide.

Example 3

There were added to a reaction vessel 104.5 parts N-ethylglucamine and 0.2 part of powdered 85% potassium hydroxide. The vessel was sealed and then flushed with nitrogen. The absolute pressure of the system was increased to 8 to 10 inches of mercury and the temperature was gradually raised until the reaction mixture became molten. Ethylene oxide was slowly introduced while the temperature of the reaction mixture was maintained in the range of 118° to 162° C. The absolute pressure of the system was held at 10 to 15 inches of mercury. The addition of ethylene oxide was continued until the theoretical amount was added for a compound in which $n$, in the formula set forth previously, equals ten. The reaction mixture was cooled, removed from the reaction vessel, and diluted with isopropanol. The isopropanol solution was neutralized with aqueous 50% sulfuric acid and then stripped under reduced pressure and filtered. The filtrate was the addition compound of N-ethylglucamine and a total number of sixty ethylene oxide units. There were then placed in a reaction vessel 284.9 parts of the above addition compound, 171 parts of stearic acid, 250 parts of toluene, and 15 parts of p-toluenesulfonic acid. This mixture was heated to the reflux temperature and maintained at that level for about twelve hours at the end of which time the theoretical amount of water from the esterification had been separated from the reaction mixture. The mixture was cooled and the catalyst neutralized by the addition of aqueous 20% sodium hydroxide. The mixture was then filtered and the filtrate was evaporated to dryness. The product was identified as the stearic ester of the addition compound of N-ethylglucamine and sixty units of ethylene oxide.

In similar ways, there were prepared the oleic ester of the addition compound of N-ethylglucamine and forty-two ethylene oxide units and, also, the lauric ester of the addition compound of N-ethylglucamine and thirty-six ethylene oxide units.

Example 4

There were mixed together in a reaction vessel 94.4 parts of N-butylglucamine and 0.2 part of powdered 85% potassium hydroxide. The vessel was sealed and then flushed with nitrogen. The absolute pressure of the system was adjusted at 8 to 10 inches of mercury. The temperature of the system was increased until the reaction mixture became molten. Ethylene oxide was slowly added until the theoretical amount was added for a compound in which $n$, in the formula previously given, equals thirteen. During the addition of ethylene oxide, the temperature of the reaction mixture was held between 120° and 160° C. and the absolute pressure was kept at 10 to 15 inches of mercury. At the conclusion of the ethylene oxide addition, the reaction mixture was cooled and removed from the reaction vessel. Isopropanol was added to the reaction mixture and the resulting solution was neutralized with aqueous 50% sulfuric acid. The solution was stripped under reduced pressure and filtered. The filtrate was the addition compound of N-butylglucamine and a total of of seventy-eight units of ethylene oxide. This addition compound, in the amount of 183.5 parts, was added to a reaction vessel along with 51.9 parts of capric acid, 15 parts of p-toluenesulfonic acid, and 250 parts of toluene. The reaction was then conducted at the reflux temperature of the reaction mixture. At the end of sixteen hours, the reaction was completed since the theoretical amount of water liberated during the esterification had been separated. The mixture was cooled and neutralized with aqueous 20% sodium hydroxide. The mixture was filtered and the filtrate was concentrated at reduced pressures. The product was identified as the capric ester of the addition compound of N-butylglucamine and seventy-eight units of ethylene oxide.

There was made in a like manner the tetradecanoic ester of the addition compound of N-butylglucamine and fifty-four ethylene oxide units.

I claim:

1. A method for the preparation of a compound having the formula

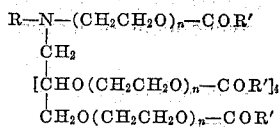

which comprises reacting a compound having the formula $$RNHCH_2(CHOH)_4CH_2OH$$

with ethylene oxide and then esterifying the resulting addition compound with an acid having the formula R'COOH, in which R is an alkyl group of one to four carbon atoms, R' is a hydrocarbon group of seven to seventeen carbon atoms, and $n$ is an integer from four to thirteen.

2. A method for the preparation of a compound having the formula

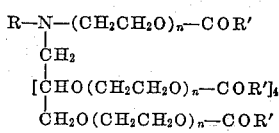

which comprises reacting a compound having the formula $$RNHCH_2(CHOH)_4CH_2OH$$

with ethylene oxide and then esterifying the resulting addition compound with an acid having the formula R'COOH, in which R is an alkyl group of one to four carbon atoms, R' is an alkyl group of seven to seventeen carbon atoms, and $n$ is an integer from four to thirteen.

3. A method for the preparation of a compound having the formula

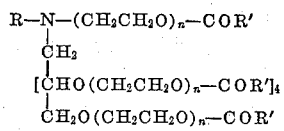

which comprises reacting at temperatures above 100° C. and pressures greater than atmospheric, in the presence of an alkali metal hydroxide catalyst, a compound having the formula $$RNHCH_2(CHOH)_4CH_2OH$$

with ethylene oxide and then reacting the resulting addition compound with an acid having the formula R'COOH, in the presence of an esterification catalyst and a volatile inert organic solvent, in which R is an alkyl group of one to four carbon atoms, R' is a hydrocarbon group of seven to seventeen carbon atoms, and $n$ is an integer from four to thirteen.

4. A method for the preparation of a compound having the formula

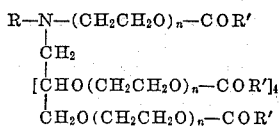

which comprises reacting at temperatures above 100° C. and pressures greater than atmospheric, in the presence of an alkali metal hydroxide catalyst, a compound having the formula $$RNHCH_2(CHOH)_4CH_2OH$$

with ethylene oxide and then reacting the resulting addition compound with an acid having the formula R'COOH, in the presence of an esterification catalyst and a volatile inert organic solvent, in which R is an alkyl group of one to four carbon atoms, R' is an alkyl group of seven to seventeen carbon atoms, and $n$ is an integer from four to thirteen.

5. A method for the preparation of a compound having the formula

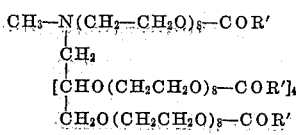

which comprises reacting N-methylglucamine, in the presence of an alkali metal hydroxide catalyst, with ethylene oxide and then reacting, in the presence of an esterification catalyst and a volatile, inert, organic solvent, the resulting addition compound with an acid having the formula R'COOH, in which R' is a hydrocarbon group of seven to seventeen carbon atoms.

6. A method for the preparation of a compound having the formula

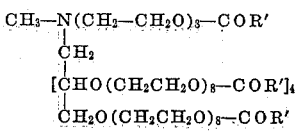

which comprises reacting N-methylglucamine, in the presence of an alkali metal hydroxide catalyst, with ethylene oxide and then reacting, in the presence of an esterification catalyst and a volatile, inert, organic solvent, the resulting addition compound with an acid having the formula R'COOH, in which R' is an alkyl group of seven to seventeen carbon atoms.

7. A method for the preparation of a compound having the formula

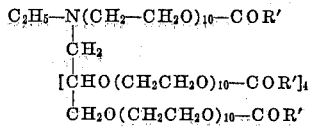

which comprises reacting N-ethylglucamine, in the presence of an alkali metal hydroxide catalyst, with ethylene oxide and then reacting, in the presence of an esterification catalyst and a volatile, inert, organic solvent, the resulting addition compound with an acid having the formula R'COOH, in which R' is a hydrocarbon group of seven to seventeen carbon atoms.

8. A method for the preparation of a compound having the formula

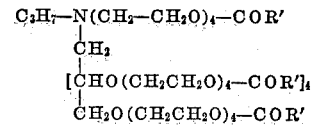

which comprises reacting N-propylglucamine, in the presence of an alkali metal hydroxide catalyst, with ethylene oxide and then reacting, in the presence of an esterification catalyst and a volatile, inert, organic solvent, the resulting addition compound with an acid having the formula R'COOH, in which R' is a hydrocarbon group of seven to seventeen carbon atoms.

9. A method for the preparation of a compound having the formula

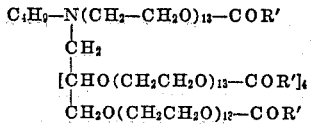

which comprises reacting N-butylglucamine, in the presence of an alkali metal hydroxide catalyst, with ethylene oxide and then reacting, in the presence of an esterification catalyst and a volatile, inert, organic solvent, the resulting addition compound with an acid having the formula R'COOH, in which R' is a hydrocarbon group of seven to seventeen carbon atoms.

10. A method for the preparation of a compound having the formula:

$$CH_3-N(CH_2-CH_2O)_8-COR'$$
$$|\ CH_2$$
$$[\dot{C}HO(CH_2CH_2O)_8-COR']_4$$
$$\dot{C}H_2O(CH_2CH_2O)_8-COR'$$

which comprises reacting N-methylglucamine, in the presence of an alkali metal hydroxide catalyst, with ethylene oxide and then reacting, in the presence of an esterification catalyst and a volatile, inert, organic solvent, the resulting addition compound with tall oil acids, R' representing the residue of said tall oil acids.

11. A method for the preparation of a compound having the formula $$CH_3-N(CH_2-CH_2O)_{10}-COR'$$
$$|\ CH_2$$
$$[\dot{C}HO(CH_2CH_2O)_{10}-COR']_4$$
$$\dot{C}H_2O(CH_2CH_2O)_{10}-COR'$$

which comprises reacting N-methylglucamine, in the presence of an alkali metal hydroxide catalyst, with ethylene oxide and then reacting, in the presence of an esterification catalyst and a volatile, inert, organic solvent, the resulting addition compound with linoleic acid, R' representing the residue of said linoleic acid.

12. A method for the preparation of a compound having the formula $$C_3H_7-N(CH_2-CH_2O)_4-COR'$$
$$|\ CH_2$$
$$[\dot{C}HO(CH_2CH_2O)_4-COR']_4$$
$$\dot{C}H_2O(CH_2CH_2O)_4-COR'$$

which comprises reacting N-propylglucamine, in the presence of an alkali metal hydroxide catalyst, with ethylene oxide and then reacting, in the presence of an esterification catalyst and a volatile, inert, organic solvent, the resulting addition compound with undecylenic acid, R' representing the residue of said undecylenic acid.

13. A method for the preparation of a compound having the formula $$C_2H_5-N(CH_2-CH_2O)_{10}-COR'$$
$$|\ CH_2$$
$$[\dot{C}HO(CH_2CH_2O)_{10}-COR']_4$$
$$\dot{C}H_2O(CH_2CH_2O)_{10}-COR'$$

which comprises reacting N-ethylglucamine, in the presence of an alkali metal hydroxide catalyst, with ethylene oxide and then reacting, in the presence of an esterification catalyst and a volatile, inert, organic solvent, the resulting addition compound with stearic acid, R' representing the residue of said stearic acid.

14. A method for the preparation of a compound having the formula $$C_4H_9-N(CH_2-CH_2O)_{13}-COR'$$
$$|\ CH_2$$
$$[\dot{C}HO(CH_2CH_2O)_{13}-COR']_4$$
$$\dot{C}H_2O(CH_2CH_2O)_{13}-COR'$$

which comprises reacting N-butylglucamine, in the presence of an alkali metal hydroxide catalyst, with ethylene oxide and then reacting, in the presence of an esterification catalyst and a volatile, inert, organic solvent, the resulting addition compound with capric acid, R' representing the residue of said capric acid.

15. As new compositions of matter, compounds having the formula $$R-N-(CH_2CH_2O)_n-COR'$$
$$|\ CH_2$$
$$[\dot{C}HO(CH_2CH_2O)_n-COR']_4$$
$$\dot{C}H_2O(CH_2CH_2O)_n-COR'$$

in which R is an alkyl group of one to four carbon atoms, R' is a hydrocarbon group of seven to seventeen carbon atoms, and $n$ is an integer from four to thirteen.

16. As new compositions of matter, compounds having the formula $$R-N-(CH_2CH_2O)_n-COR'$$
$$|\ CH_2$$
$$[\dot{C}HO(CH_2CH_2O)_n-COR']_4$$
$$\dot{C}H_2O(CH_2CH_2O)_n-COR'$$

in which R is an alkyl group of one to four carbon atoms, R' is an alkyl group of seven to seventeen carbon atoms, and $n$ is an integer from four to thirteen.

17. As new compositions of matter, compounds having the formula $$CH_3-N(CH_2-CH_2O)_8-COR'$$
$$|\ CH_2$$
$$[\dot{C}HO(CH_2CH_2O)_8-COR']_4$$
$$\dot{C}H_2O(CH_2CH_2O)_8-COR'$$

in which R' is a hydrocarbon group of seven to seventeen carbon atoms.

18. As new compositions of matter, compounds having the formula $$CH_3-N(CH_2-CH_2O)_8-COR'$$
$$|\ CH_2$$
$$[\dot{C}HO(CH_2CH_2O)_8-COR']_4$$
$$\dot{C}H_2O(CH_2CH_2O)_8-COR'$$

in which R' is an alkyl group of seven to seventeen carbon atoms.

19. As new compositions of matter, compounds having the formula $$C_2H_5-N(CH_2-CH_2O)_{10}-COR'$$
$$|\ CH_2$$
$$[\dot{C}HO(CH_2CH_2O)_{10}-COR']_4$$
$$\dot{C}H_2O(CH_2CH_2O)_{10}COR'$$

in which R' is a hydrocarbon group of seven to seventeen carbon atoms.

20. As new compositions of matter, compounds having the formula $$C_3H_7-N(CH_2-CH_2O)_4-COR'$$
$$|\ CH_2$$
$$[\dot{C}HO(CH_2CH_2O)_4-COR']_4$$
$$\dot{C}H_2O(CH_2CH_2O)_4-COR'$$

in which R' is a hydrocarbon group of seven to seventeen carbon atoms.

21. As new compositions of matter, compounds having the formula $$C_4H_9-N(CH_2-CH_2O)_{13}-COR'$$
$$|\ CH_2$$
$$[\dot{C}HO(CH_2CH_2O)_{13}-COR']_4$$
$$\dot{C}H_2O(CH_2CH_2O)_{13}-COR'$$

in which R' is a hydrocarbon group of seven to seventeen carbon atoms.

22. As a new composition of matter, the compound having the formula $$CH_3-N(CH_2-CH_2O)_8-COR'$$
$$|$$
$$CH_2$$
$$|$$
$$[CHO(CH_2CH_2O)_8-COR']_4$$
$$|$$
$$CH_2O(CH_2CH_2O)_8-COR'$$

in which R' represents the residue from tall oil acids.

23. As a new composition of matter, the compound having the formula $$CH_3-N(CH_2-CH_2O)_{10}-COR'$$
$$|$$
$$CH_2$$
$$|$$
$$[CHO(CH_2CH_2O)_{10}-COR']_4$$
$$|$$
$$CH_2O(CH_2CH_2O)_{10}-COR'$$

in which R' represents the residue from linoleic acid.

24. As a new composition of matter, the compound having the formula $$C_2H_5-N(CH_2-CH_2O)_{10}-COR'$$
$$|$$
$$CH_2$$
$$|$$
$$[CHO(CH_2CH_2O)_{10}COR']_4$$
$$|$$
$$CH_2O(CH_2CH_2O)_{10}-COR'$$

in which R' represents the residue from stearic acid.

25. As a new composition of matter, the compound having the formula $$C_3H_7-N(CH_2-CH_2O)_4-COR'$$
$$|$$
$$CH_2$$
$$|$$
$$[CHO(CH_2CH_2O)_4-COR']_4$$
$$|$$
$$CH_2O(CH_2CH_2O)_4-COR'$$

in which R' represents the residue from undecylenic acid.

26. As a new composition of matter, the compound having the formula $$C_4H_9-N(CH_2-CH_2O)_{13}-COR'$$
$$|$$
$$CH_2$$
$$|$$
$$[CHO(CH_2CH_2O)_{13}-COR']_4$$
$$|$$
$$CH_2O(CH_2CH_2O)_{13}-COR'$$

in which R' represents the residue from capric acid.

References Cited in the file of this patent

UNITED STATES PATENTS

| | | |
|---|---|---|
| 1,985,424 | Piggott | Dec. 25, 1934 |
| 2,586,767 | Wilson | Feb. 19, 1952 |
| 2,667,478 | Schwartz | Jan. 26, 1954 |
| 2,677,700 | Jackson et al. | May 4, 1954 |
| 2,703,798 | Schwartz | Mar. 8, 1955 |